(12) United States Patent
Bausch et al.

(10) Patent No.: US 12,030,420 B2
(45) Date of Patent: Jul. 9, 2024

(54) PACKAGE STORAGE AND DELIVERY UNIT

(71) Applicants: Jacob Bausch, Menomonee Falls, WI (US); Caleb Cordova, Brookfield, WI (US); Thomas C. Marshall, Hartford, WI (US)

(72) Inventors: Jacob Bausch, Menomonee Falls, WI (US); Caleb Cordova, Brookfield, WI (US); Thomas C. Marshall, Hartford, WI (US)

(73) Assignee: Meru Capital holdings, LLC, Hartland, WI (US)

(*) Notice: Subject to any disclaimer, the term of this patent is extended or adjusted under 35 U.S.C. 154(b) by 0 days.

(21) Appl. No.: 18/304,895

(22) Filed: Apr. 21, 2023

(65) Prior Publication Data
US 2023/0311738 A1    Oct. 5, 2023

Related U.S. Application Data

(63) Continuation of application No. PCT/US2021/056954, filed on Oct. 28, 2021.

(60) Provisional application No. 63/106,787, filed on Oct. 28, 2020.

(51) Int. Cl.
*B60P 3/00* (2006.01)
*B60P 1/64* (2006.01)
*B60P 1/36* (2006.01)

(52) U.S. Cl.
CPC ............. *B60P 3/007* (2013.01); *B60P 1/6427* (2013.01); *B60P 1/36* (2013.01)

(58) Field of Classification Search
CPC .............................. B60P 3/007; B60P 1/6427
USPC .......................................................... 414/679
See application file for complete search history.

(56) References Cited

U.S. PATENT DOCUMENTS

| | | | | |
|---|---|---|---|---|
| 9,114,748 | B1* | 8/2015 | Blatstein | B60P 1/6427 |
| 10,479,418 | B1* | 11/2019 | Patel | B65D 90/0066 |
| 2017/0225601 | A1 | 8/2017 | Borders et al. | |
| 2017/0291766 | A1 | 10/2017 | Orth et al. | |
| 2019/0113935 | A1* | 4/2019 | Kuo | B60P 1/00 |
| 2020/0074404 | A1* | 3/2020 | Gil, Jr. | B65G 1/133 |
| 2022/0105853 | A1* | 4/2022 | Lee | B60P 1/003 |
| 2022/0119210 | A1* | 4/2022 | Felton | B65G 1/0435 |

FOREIGN PATENT DOCUMENTS

| | | | | |
|---|---|---|---|---|
| CN | 106429162 A | | 2/2017 | |
| DE | 4009635 A1 | | 10/1991 | |
| DE | 102018009223 A1 | * | 4/2019 | ............. B60P 3/007 |
| DE | 102018007522 B3 | * | 10/2019 | ............ B60P 1/6427 |
| DE | 102018005350 A1 | * | 1/2020 | ............. B60P 3/007 |
| NL | 1015889 C2 | | 2/2002 | |

* cited by examiner

*Primary Examiner* — James Keenan
(74) *Attorney, Agent, or Firm* — Reinhart Boerner Van Deuren P.C.

(57) ABSTRACT

A storage pod for use with a delivery vehicle is provided. The storage pod is configured to store packages and to dispense them when sufficiently close to a delivery location. Methods of delivering packages using a storage pod are provided.

20 Claims, 13 Drawing Sheets

PACKAGE STORAGE AND DELIVERY UNIT

CROSS-REFERENCE TO RELATED PATENT APPLICATIONS

This patent application is a continuation of copending U.S. PCT Application No. PCT/US2021/056954, filed Oct. 28, 2021, which claims the benefit of U.S. Provisional Patent Application No. 63/106,787, filed Oct. 28, 2020, the entire teachings and disclosure of each application are incorporated herein in their entireties by reference thereto.

FIELD OF THE INVENTION

This invention generally relates to systems and methods for delivering packages.

BACKGROUND OF THE INVENTION

As the retail industry transitions more and more from brick and mortar establishments to ever increasing online retail, the fulfillment of purchases becomes an ever increasing industry. A large portion of this fulfillment industry relates to the process of shipping the purchases from the retailer or an affiliated warehouse to the purchaser.

It is estimated that the cost of shipping packages in the retail in North America is annually in excess of $2.5 billion. As such, even minimal reductions in the overall cost of shipping in the retail industry can result in significant savings.

Some of the significant costs related to shipping include the labor costs for loading the delivery vehicles, driving the delivery vehicles, and the packaging of the product for shipment. As such, if any of these costs can be reduced, significant savings can be had.

Improved organization and storage efficiency of packages to be delivered within the delivery vehicle can reduce delivery times and associated expense.

One problem with existing delivery vehicles is that the storage area where products are stored requires a walking path where the delivery person is allowed to access the packages stored within the storage area. This walking path takes up an undesirable amount of storage space limiting the amount of products that can be stored in the vehicle. Further, this arrangement requires the driver to actually enter the storage space and locate the package increasing the amount of time it takes to deliver a package.

Features of the disclosed concepts provide improvements in the retail delivery supply chain.

BRIEF SUMMARY OF THE INVENTION

Examples provide a new and improved storage pod for use with a delivery vehicle. Further examples provide a new and improved delivery vehicle system that uses a storage pod that can dispense packages to the delivery person without the delivery person being required to enter the storage zone of the delivery vehicle and/or locate the package from a group of packages within the storage zone of the delivery vehicle.

In an example, a storage pod removably mountable to a delivery vehicle for holding packages to be delivered includes a frame and a conveying system. The frame defines a storage zone where a plurality of packages are stored and a dispensing zone from which packages are dispensed from the frame. The conveying system mounts to the frame including configured to transition packages from the storage zone to the dispensing zone.

In one example, the storage zone includes a first shelf mounted to the frame. The first shelf extends between a first end and a second end. A first axis is defined between the first end and the second end. The conveying system includes a second package actuation arrangement configured to move product supported by the first shelf toward the first shelf end (e.g. parallel/along the first axis).

In one example, the first shelf is vertically offset from the dispensing zone. The conveying system includes a second package actuation arrangement in the form of an elevator to transition the package vertically between an elevation of the first shelf and an elevation of the first dispensing zone.

In one example, the elevator includes a third package actuation arrangement configured to move product along a second axis that is perpendicular to the first axis.

In one example, the conveying system includes a fourth package actuation arrangement configured to move product out of the dispensing zone.

In one example a package actuation arrangement may include a pusher, a conveyor and/or a robotic arm.

In one example, the storage zone includes first and second shelves and the conveying system includes first and second package actuation arrangements. The first shelf mounts to the frame. The first shelf extends between a first end and a second end. The first axis is defined between the first end and the second end. The second shelf mounts to the frame vertically offset from the first shelf. The second shelf extends between a first end and a second end of the second shelf. At least one of the first and second shelves is vertically offset from the dispensing zone. The first package actuation arrangement includes a first pusher having a first pusher arm movable relative to the first shelf parallel to the first axis to push product supported by the first shelf toward the first end of the first shelf. The first pusher arm is movable parallel to a first plane being orthogonal to the first axis such that the first pusher arm can be inserted between adjacent packages on the first shelf. The second package actuation arrangement includes a second pusher having a second pusher arm movable relative to the second shelf parallel to the first axis to push product supported by the second shelf toward the first end of the second shelf. The second pusher arm is movable parallel to the first plane such that the second pusher arm can be inserted between adjacent packages on the second shelf.

In one example, at least one of the first and second shelves is vertically offset from the dispensing zone. The conveying system includes an elevator to transition a package vertically between an elevation of the at least one of the first and second shelves that is vertically offset from the dispensing zone and an elevation of the dispensing zone. The first and second pushers are configured to push packages from the first and second shelves, respectively, onto the elevator.

In one example, the conveying system further includes a third package actuation arrangement configured to move a package laterally perpendicular to the first axis.

In one example, the third package actuation arrangement is one of a conveyor forming part of the elevator, a pusher or an actuator that moves the shelf upon which the package is sitting.

In one example, a package dispensing actuation arrangement is provided for pushing packages out of the dispensing zone.

In one example, a control system includes a positioning module configured to determine a global position. The control system further includes a controller configured to control the conveying system to dispense a product from the frame when the determined global position is sufficiently proximate a delivery location.

In an example, a delivery vehicle system is provided. The system includes a vehicle that includes a chassis and a cab. The system includes a storage pod as outlined above removably mounted to the delivery vehicle. The system includes a package access zone, where a user can access packages. This may be provided by the storage pod, the delivery vehicle or a combination of both the storage pod and the delivery vehicle. THe system includes a dispensing actuation arrangement configured to transition a package from the dispensing zone to the package access zone such that a user can access the package.

In one example, the delivery vehicle includes an enclosure. The storage pod is loadable into the enclosure with packages located in the storage zone. Thus the storage pod can be loaded external of the vehicle and then the entire pod can be mounted to the delivery vehicle.

In one example, the storage pod is removeable from the enclosure in a substantially complete unit.

In one example, a control system including a positioning module configured to determine a global position of the delivery vehicle is provided. The control system further includes a controller configured to control the conveying system to dispense a predetermined package from the storage pod when the determined global position is sufficiently proximate a delivery location for the package.

In one example, the package access zone is located within the cab.

In one example, the package access zone is located within the frame of the storage pod.

In an example, a storage pod to be removably mounted to a delivery vehicle is provided. The storage pod holds packages to be delivered and is configured to transport them from a stored position to a package access zone where a user can access the packages. The storage pod includes a frame and a conveying system. The frame includes a storage zone where a plurality of packages are stored. The storage zone includes first and second shelves mounted to the frame that extend between first and second ends. A first axis is defined between the first end and the second end. A dispensing zone is provided from which packages are dispensed from the frame. The dispensing zone is vertically offset from at least one of the first and second shelves. A conveying system mounts to the frame and is configured to transition packages from the storage zone to the dispensing zone. The conveying system includes first and second pushers. The first pusher has a pusher arm movable relative to the first shelf parallel to the first axis to push product supported by the first shelf toward the first end of the first shelf. The pusher arm is movable parallel to a first plane being orthogonal to the first axis. The second pusher has a second pusher arm movable relative to the second shelf parallel to the first axis to push product supported by the second shelf toward the first end of the second shelf. The second pusher arm is movable parallel to the first plane. An elevator is vertically movable between the dispensing zone and the at least one of the first and second shelves that is vertically offset from the dispensing zone to transition packages vertically. A dispensing pusher is adjacent the dispensing zone. The dispensing pusher is movable relative to the dispensing zone to push packages out of the dispensing zone.

In one example, a control arrangement automatically controls the conveying system to transition a predetermined package from the storage zone to the dispensing zone and then out of the dispensing zone using the dispensing pusher when the storage pod reaches a desired delivery location.

In an example, a method of delivering a package is provided. The method includes loading a package onto a shelf of a storage pod of any preceding claim. The method includes mounting the storage pod to a delivery vehicle. The method includes transporting the storage pod to a delivery location. The method includes transitioning the package from the storage zone of the storage pod to the dispensing zone, with the conveying system. The method includes dispensing the package out of the storage pod.

In one example, dispensing the package includes transitioning the package from the dispensing zone into a package access zone. The method further includes manually removing the package from the package access zone.

In one example, dispensing the package out of the storage pod is done using a dispensing actuation arrangement.

In one example, the step of transitioning the package from the storage zone to the dispensing zone occurs automatically when the storage pod is positioned sufficiently close to a delivery location and the location of the storage pod is determined using global positioning.

In some examples, the storage pod includes totes that are removably carried by the frame. The totes hold the packages and the movement of the packages out of the storage pod occurs by moving the totes between the storage zone and the dispensing zone and then dispensing the totes out of the dispensing zone.

In one example, when totes are used, the totes are carried by removable carriages. The carriages are removable from the storage pod so that the totes may be filled with packages. Once all of the totes are filled, the carriage, and filled totes, are loaded into the frame.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
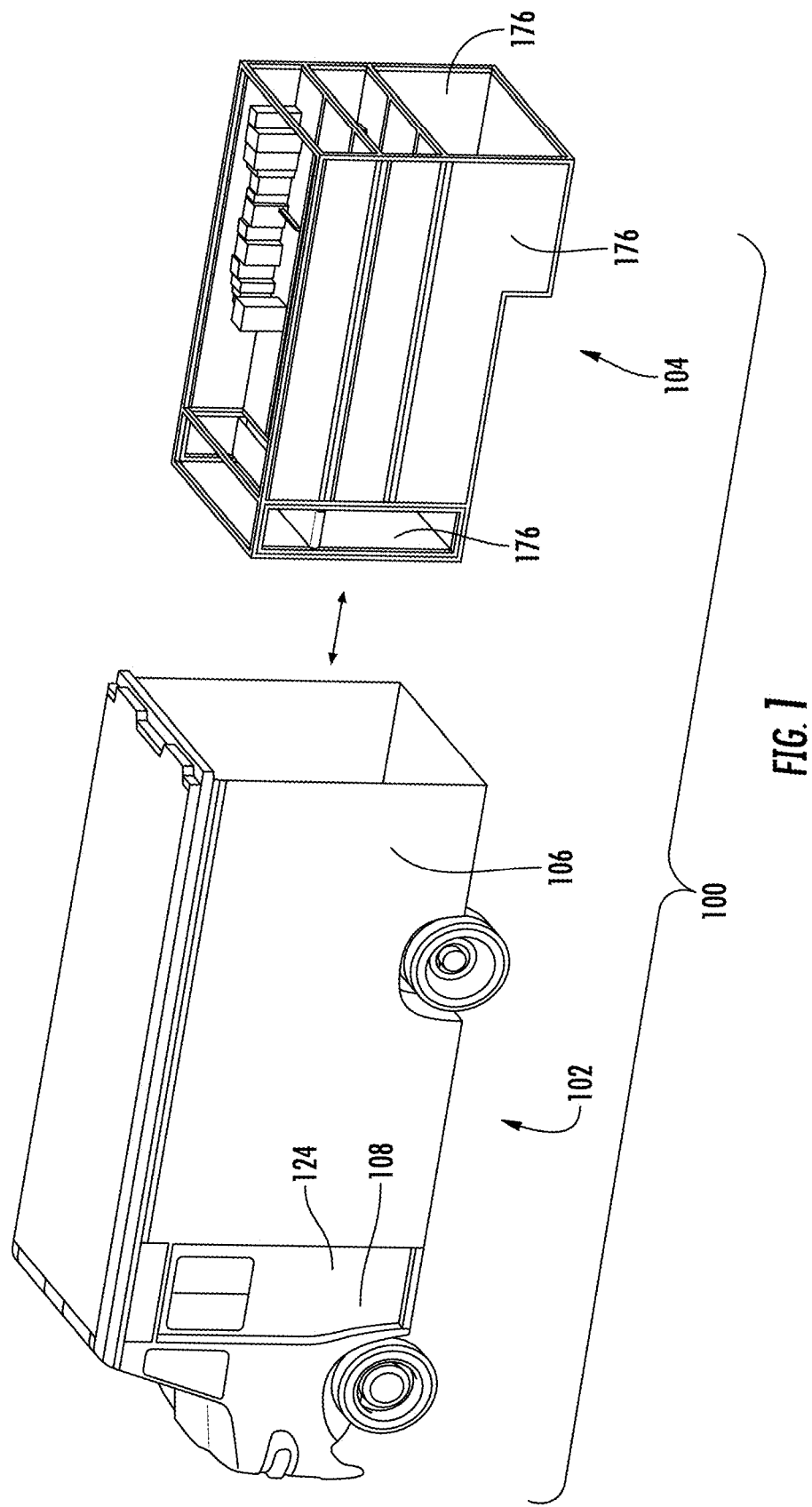
FIG. 1 is a perspective illustration of a delivery vehicle system including a delivery vehicle and a removable storage pod with the storage pod removed.

FIG. 1 illustrates a delivery vehicle system 100 that includes a delivery vehicle 102 and a storage pod 104. The delivery vehicle 102 in the illustrated example includes a storage enclosure 106 in which the storage pod 104 is removably mounted and a cab 108 in which the driver controls the delivery vehicle system 100.

The use of other delivery vehicles is contemplated. For example, the delivery vehicle could omit the enclosure and directly removably mount the storage pod 104 to a chassis of the delivery vehicle.

In one example, the delivery vehicle 102 may be a flatbed truck. In another example, the delivery vehicle may be a delivery van or a box truck.

Figure 2:
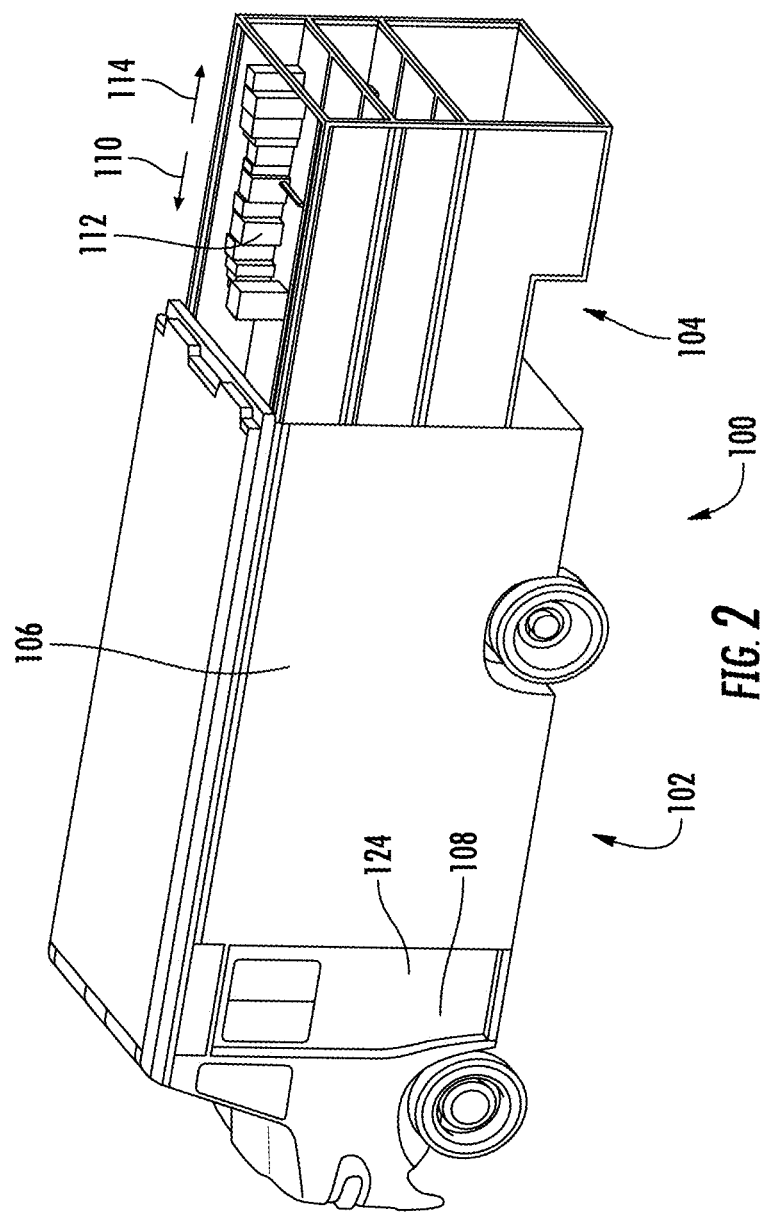
FIG. 2 illustrates the storage pod partially inserted into a storage enclosure of the delivery vehicle.

With reference to FIG. 2, in an example, the storage pod 104 is mountable to the chassis of the delivery vehicle 102 while the storage pod 104 is loaded with packages to be delivered to delivery locations (e.g. businesses or residences). As illustrated in FIG. 2, the storage pod 104 is removably mounted to the chassis of the delivery vehicle 102 by being inserted into the storage enclosure 106 of the delivery vehicle 102.

The insertion of the storage pod 104 into the storage enclosure 106 is illustrated schematically by arrow 110.

After the user has delivered all of the packages 112, the storage pod 104 can be removed from the delivery vehicle 102 and reloaded with another set of packages 112 to be delivered. Removal of the storage pod 104 is illustrated schematically by arrow 114.

Figure 3:
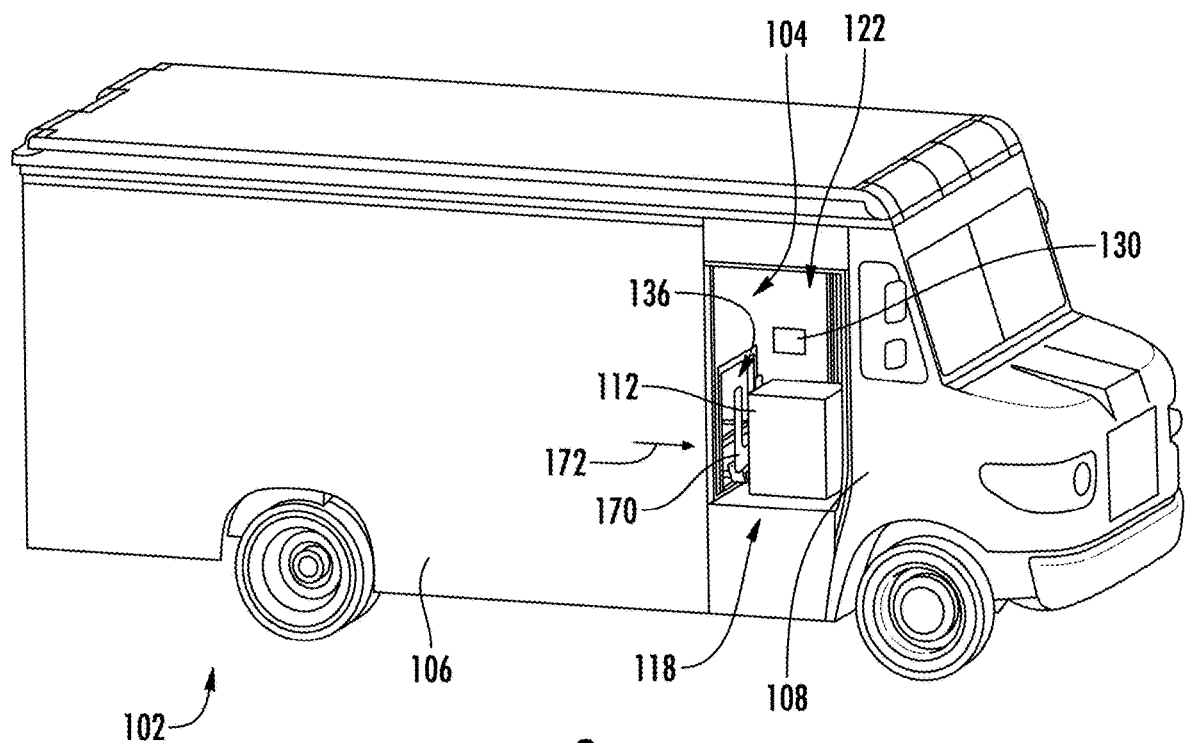
FIG. 3 illustrates a package access zone where a delivery person may access packages to be delivered.

With reference to FIG. 3, in an example, the delivery vehicle system 100 includes a package access zone 118 where a user can access packages 112. The delivery vehicle system 100 is configured to dispense packages 112 from the storage pod 104 to the package access zone 118 without the user having to enter the storage enclosure 106 or at least having to enter the region of the storage enclosure where packages are generally stored during transit along the delivery route.

In this example, the package access zone 118 forms part of the cab 108 of the delivery vehicle 102 and is accessible from the exterior of the delivery vehicle system 100. The package access zone 118 can also be accessed from the driver seat of the delivery vehicle 102. In this example, the package access zone 118 is accessible through an opening 122 opposite door 124 of cab 108 (see also FIG. 1) by the user. Opening 122 may have a door (not shown) to close the opening 122 when deliveries are not being made or when the delivery vehicle system 100 is in motion.

Examples of the delivery vehicle system 100 are configured to automatically dispense packages from the storage pod 104 into the package access zone 118. This prevents the need for the driver/user to enter into the storage area of the storage enclosure 106 to find and remove a package (or packages) to be delivered at a predetermined delivery location.

The automatic dispensing can be initiated by the driver by pressing a button to cause the system to dispense the relevant package into the package access zone 118. Alternatively, a control system 130 may be provided that controls the storage pod 104 to automatically dispense the relevant package into the package access zone 118. This could include using global positioning information to determine that the storage pod 104 is at a location sufficiently close to the desired delivery location to cause the storage pod 104 to automatically dispense the relevant package(s) 112 to be transitioned from the storage pod 104 to the package access zone 118.

Global positioning information can include satellite based global positioning, cellular tower global positioning, Wi-Fi or any other way for the system to know the location of the delivery system 100.

Figure 4:
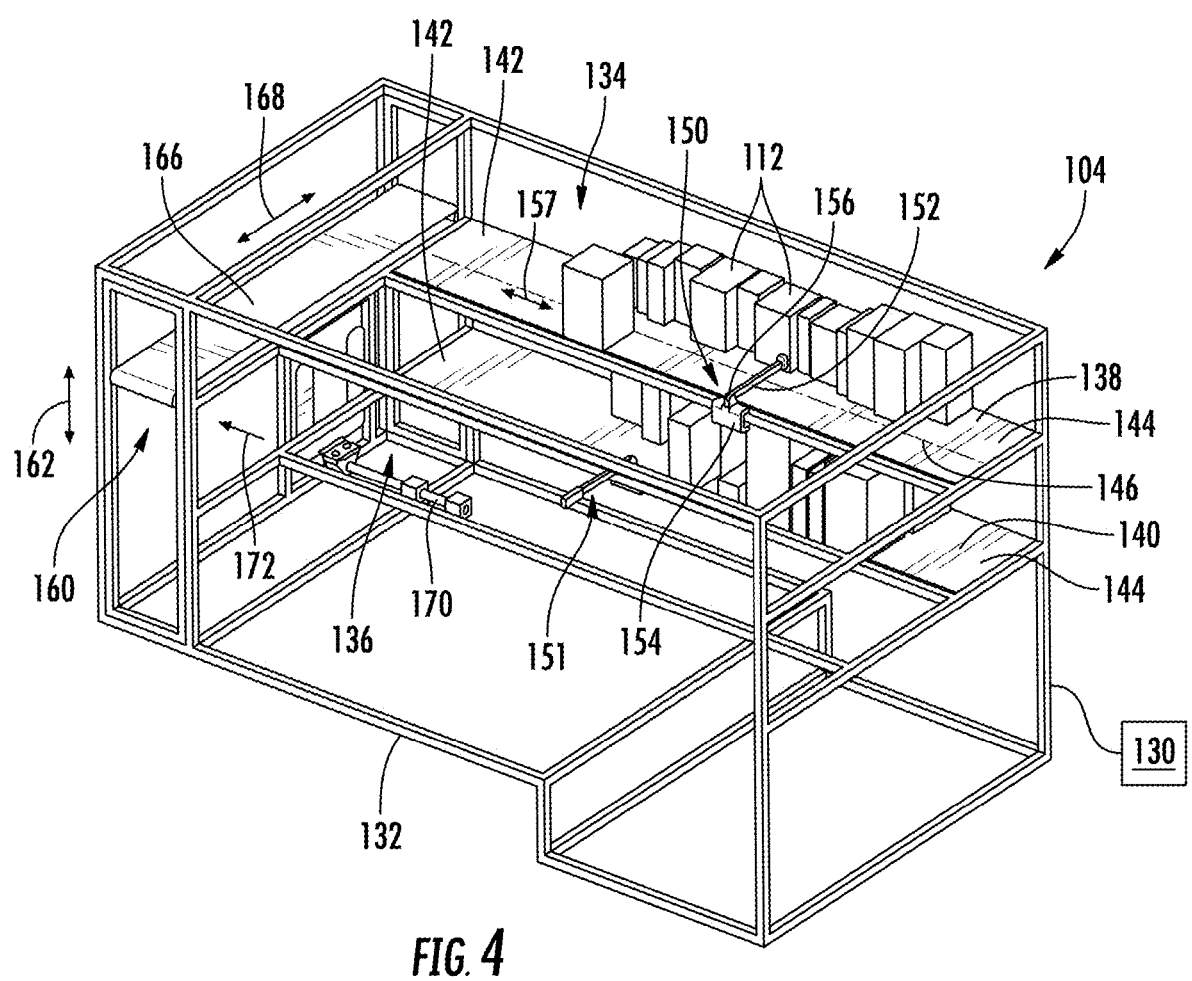
FIGS. 4 and 5 are partial perspective illustrations of the storage pod of FIG. 1.

FIG. 4 illustrates an example of a storage pod 104. The storage pod 104 includes a structural frame 132 to which the rest of the components of the storage pod 104 are operably mounted. The frame 132 generally defines a storage zone 134 where packages 112 to be delivered are located during transport and a dispensing zone 136 where the packages 112 are dispensed from the storage pod 104 when the user has reached the delivery location for the relevant package(s) 112.

In FIG. 4, the storage zone 134 includes a plurality of vertically offset shelves. In FIG. 4, first and second shelves 138, 140 are illustrated. Different number of shelves are contemplated such as only a single shelf or more shelves. Further, more than two shelves can be vertically offset from one another.

The shelves 138, 140 extend between first and second ends 142, 144. First end 142 is adjacent the dispensing zone 136. An axis 146 extends between the first and second ends 142, 144.

The system 100 includes a conveying system that transitions the packages 112 from the storage zone 134 and corresponding shelves 138, 140 to the dispensing zone 136 and in some examples out of the dispensing zone. The conveying system may be part of the storage pod 104 or otherwise part of the vehicle 102.

The conveying system in the illustrate example includes a package actuation arrangement 150 for moving the packages 112 on shelf 138 towards the first end 142. The package actuation arrangement 150 is illustrated in the form of a pusher (also referred to herein as pusher 150) having a pusher arm 152 that can be operably moved along (e.g. parallel to) axis 146. In this example, the pusher arm 152 is attached to a trolley 154 that moves parallel to axis 146 and is positioned to a side of shelf 138.

The pusher arm 152 is pivotally attached to trolley 154 for movement parallel to a plane that is orthogonal to axis 146.

Figure 6:
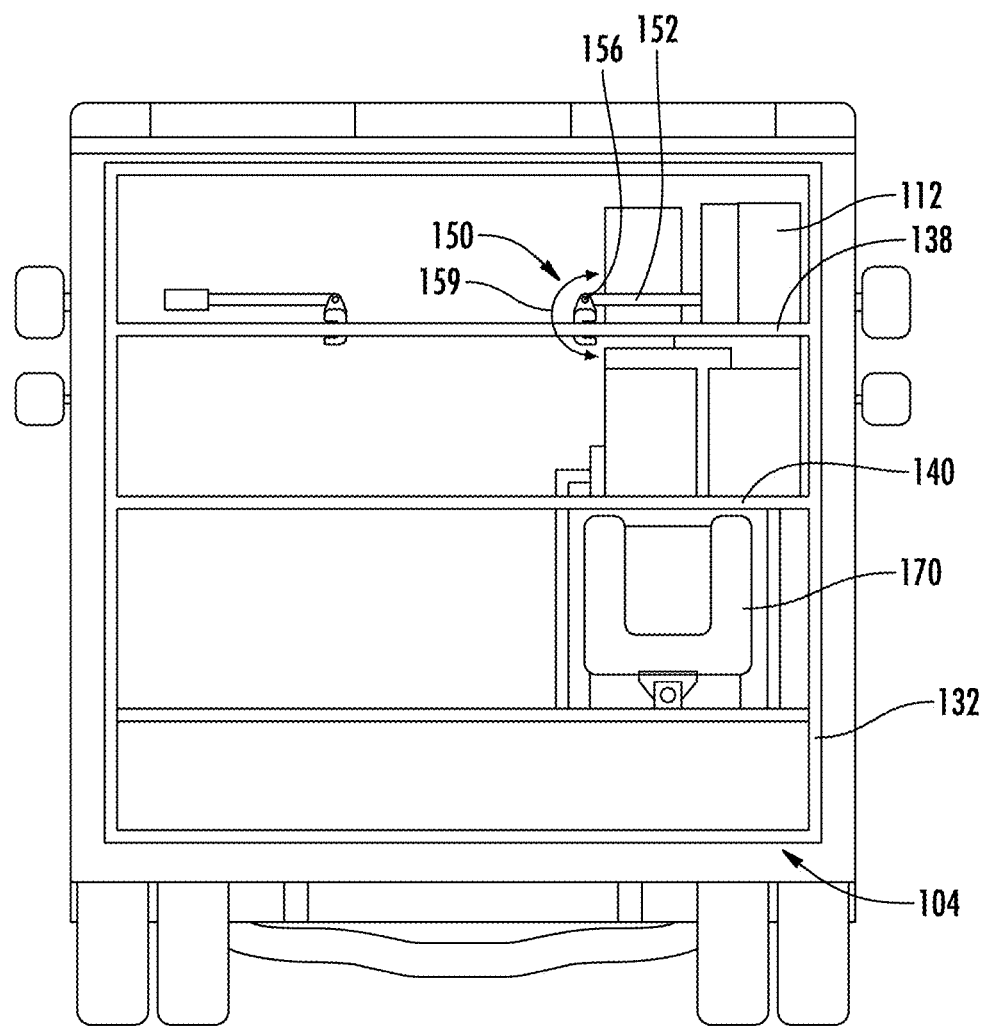
FIG. 6 is a rear view illustration of the delivery vehicle system of FIG. 1.
Figure 7:
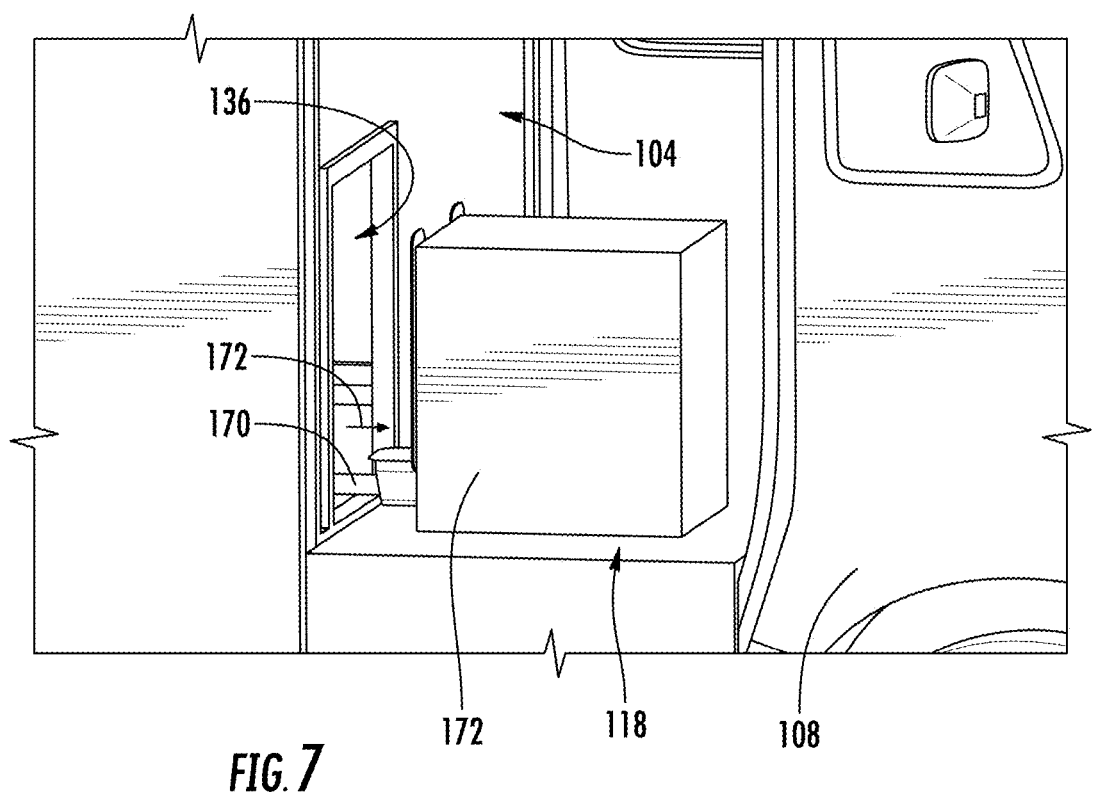
FIG. 7 is an enlarged illustration of the package access zone of the delivery vehicle system of FIG. 1.

Movement can be in both directions toward and away from first end 142 as illustrated by arrow 157. More particularly, in this example pusher arm 152 rotates within a plane that is orthogonal to axis 146 about a hinge 156. This motion is illustrated by arrow 159 in FIG. 6. This allows the pusher arm 152 to be inserted between adjacent packages, such as illustrated in FIG. 4.

Once pusher arm 152 is in place, pusher 150 can move towards first end 142 to move the relevant package 112 towards the dispensing zone 126.

While only the package actuation arrangement 150 was described, a further package actuation arrangement is associated with the second shelf 140 and operates in the same way as actuation arrangement 150. Alternatively, the same package actuation arrangement 150 could be used for multiple shelves.

While actuation arrangements 150 are illustrated as pushers, other actuation arrangements such as conveyor belts or robot arms (see e.g. robotic arm 153 in FIG. 13) could be implemented.

While pusher arms 152 are described as rotating to be positioned between adjacent packages 112, in other examples, the arms 152 could be drive linearly perpendicular to axis 146 between adjacent packages. Further, in some embodiments, arm 152 could extend telescopically.

In this example, both shelves 138, 140 are vertically offset from the dispensing zone 136. As such, the conveying system includes vertical actuation arrangement 160 which is in the form of an elevator (also referred to herein as elevator 160). Elevator 160 is located proximate first end 142 of the shelves 138, 140 and is used to transition the packages vertically to the vertical elevation of the dispensing zone 136. Vertical movement of the elevator 160 is illustrated by arrow 162.

The elevator 160 in this example is actually two separate actuation arrangements in one. Not only is the elevator 160 configured for vertical movement of packages 112, elevator 112 includes a second package actuation arrangement 166 in the form of a conveyor belt (also referred to herein as conveyor belt 166). Conveyor belt 166 is configured to move packages laterally as illustrated by arrow 168 (e.g. about a second axis that is generally perpendicular to axis 146). Conveyor belt 166 is used when packages 112 are stored within the storage zone 134 but not aligned with the dispensing zone 136.

Thus, once package actuation arrangements 150 push packages onto elevator 160, the elevator 160 can move the packages 112 vertically (arrow 162) as well as laterally (168) to position the packages 112 within the dispensing zone 136. While a conveyor belt is illustrated, elevator 160 could use a pusher associated therewith rather than a conveyor belt in other examples. Further yet, slanted ramps could also be used that rely on gravity for locating the packages 112 within the dispensing zone 136.

Figure 13:
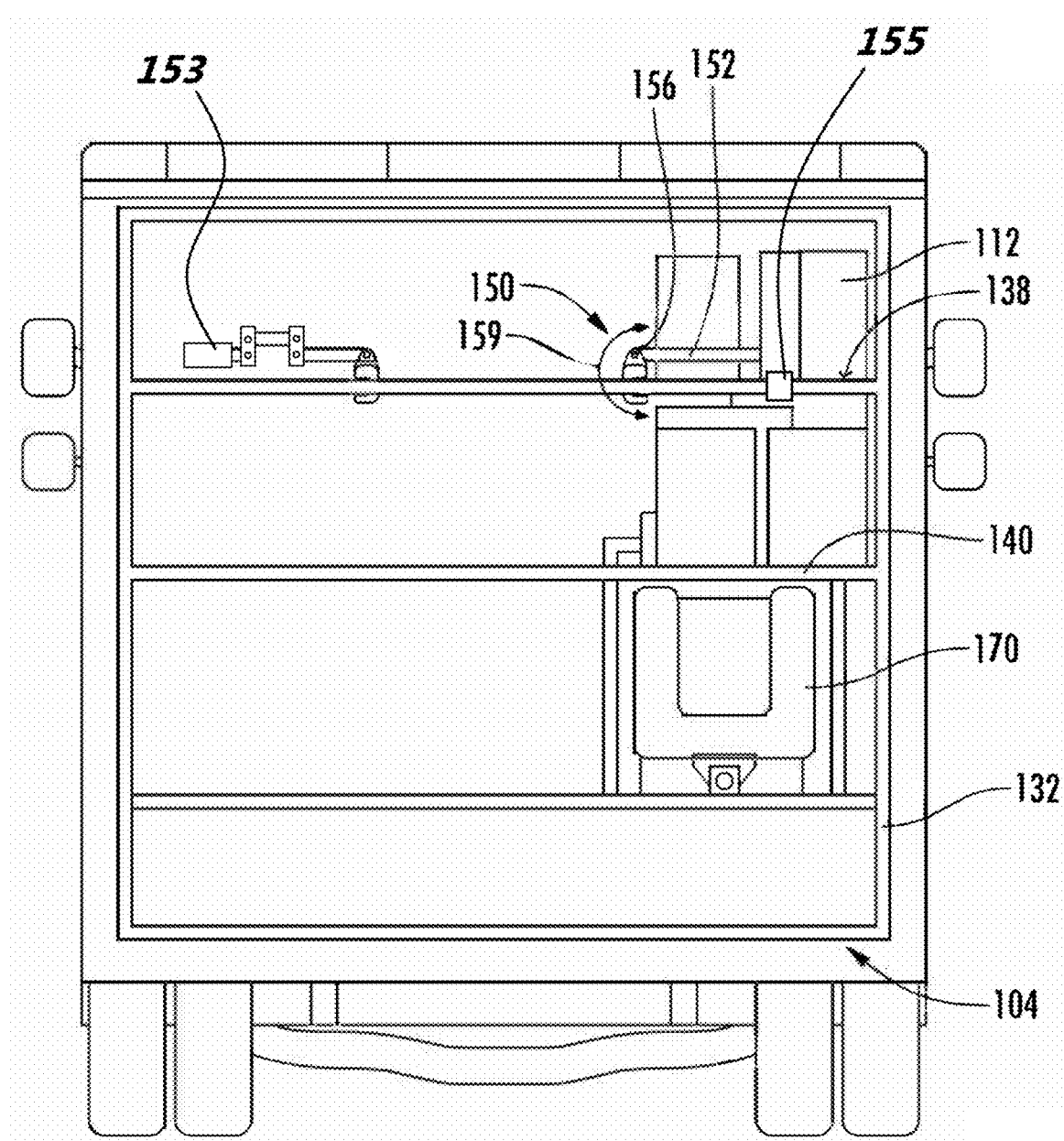
FIG. 13 is a rear view illustration of a delivery vehicle system of FIG. 1 that includes a robotic arm and an actuator for moving a shelf.

Further yet, in some examples, this package actuation arrangement that moves the packages 112 along the second axis that is perpendicular to axis 146 (e.g. illustrated by arrow 168) could be an actuation arrangement that laterally moves the entire shelf prior to loading the packages 112 onto the elevator 160 (see e.g. actuation arrangement 155 of FIG. 13 that can operably move shelf 138 relative to frame 132 parallel to axis 168).

Figure 5:
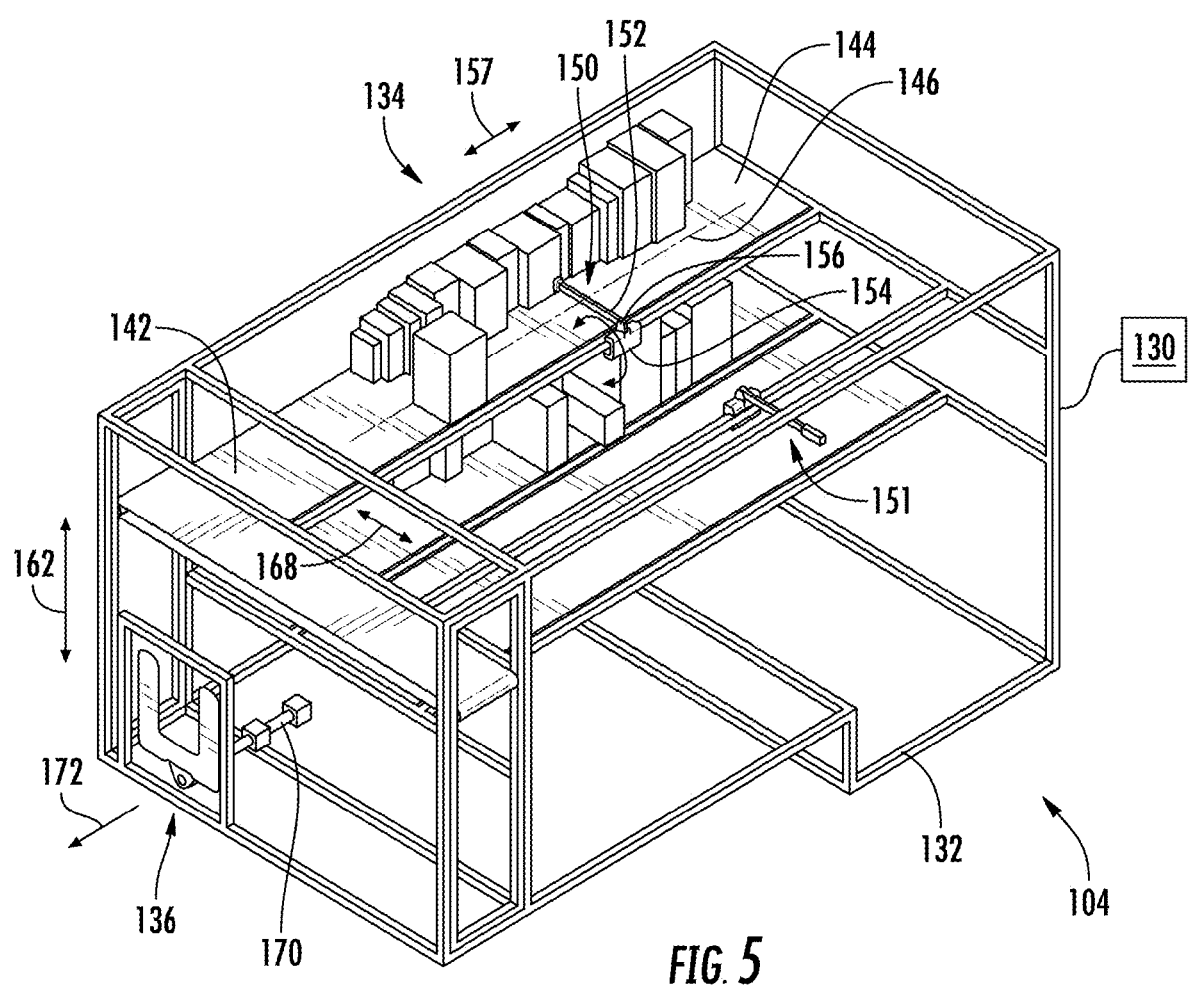

A dispensing actuation arrangement 170 dispenses packages 112 out of the dispensing zone 136 and storage pod 104, represented by arrow 172 in FIG. 5. In the illustrated example, the dispensing actuation arrangement 170 is in the form of a pusher (also referred to herein as pusher 170). Alternative arrangements are contemplated such as conveyors or ramped arrangements.

FIG. 3 illustrates a package 112 that has been dispensed from the storage pod 104 and pushed out of the dispensing zone 136 by pusher 170 and into package access zone 118.

The frame 132 of the storage pod 104 may include outer paneling to enclose the storage zone 134. The outer paneling can help prevent spillage of packages 112 when loading the storage pod 104 into the storage enclosure 106. Some paneling 176 is illustrated in FIG. 1.

Figure 8:
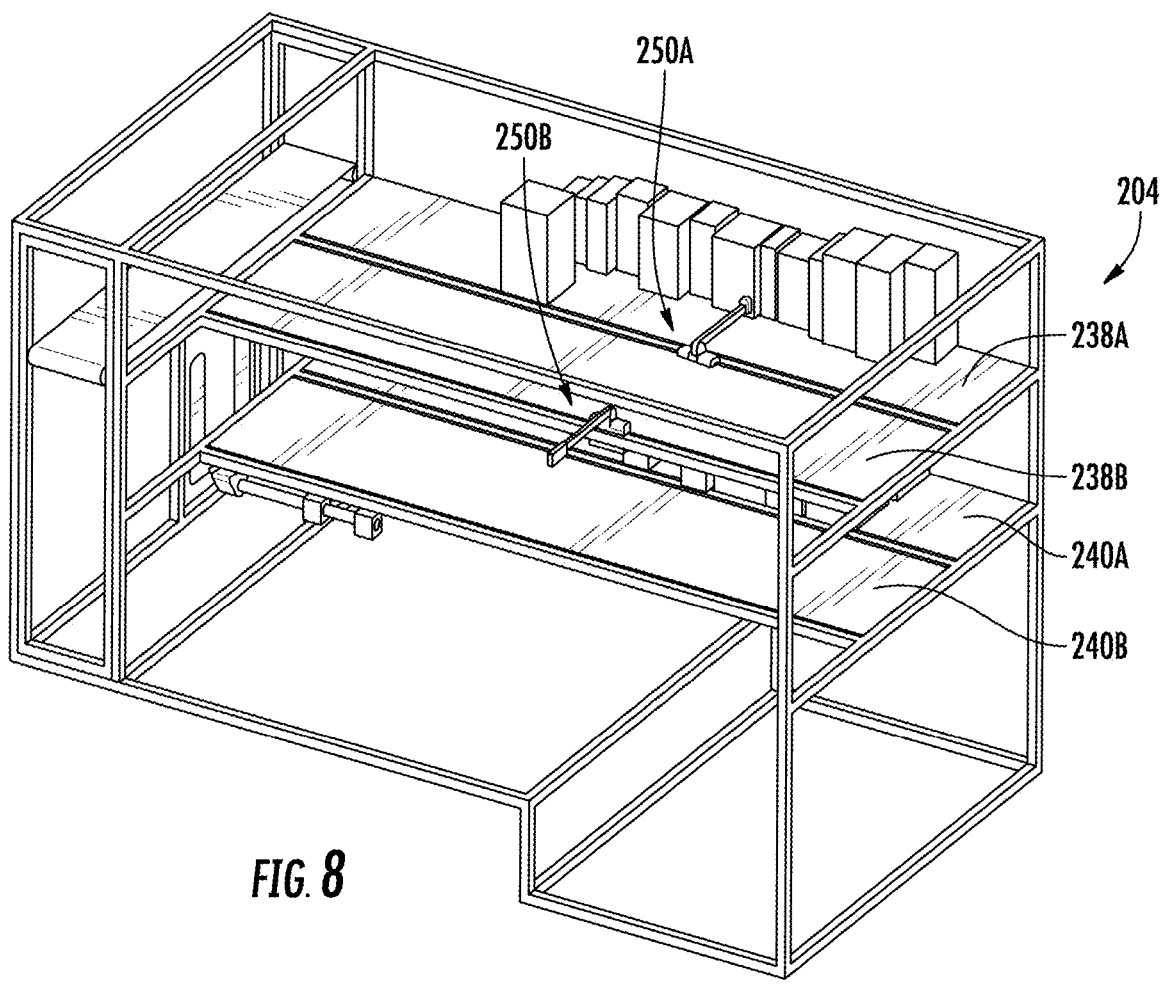
FIG. 8 is an alternative storage pod for use in the delivery vehicle system of FIG. 1.

FIG. 8 illustrates an alternative example of a storage pod 204. In this example, there are multiple shelves 238A, 238B or 240A, 240B. In this shelf 238A has a pusher 250A associated therewith while shelf 238B has pusher 250B associated therewith. However, in some embodiments, a single pusher could be used to move product off of both shelves 238A and 240B.

Figure 9:
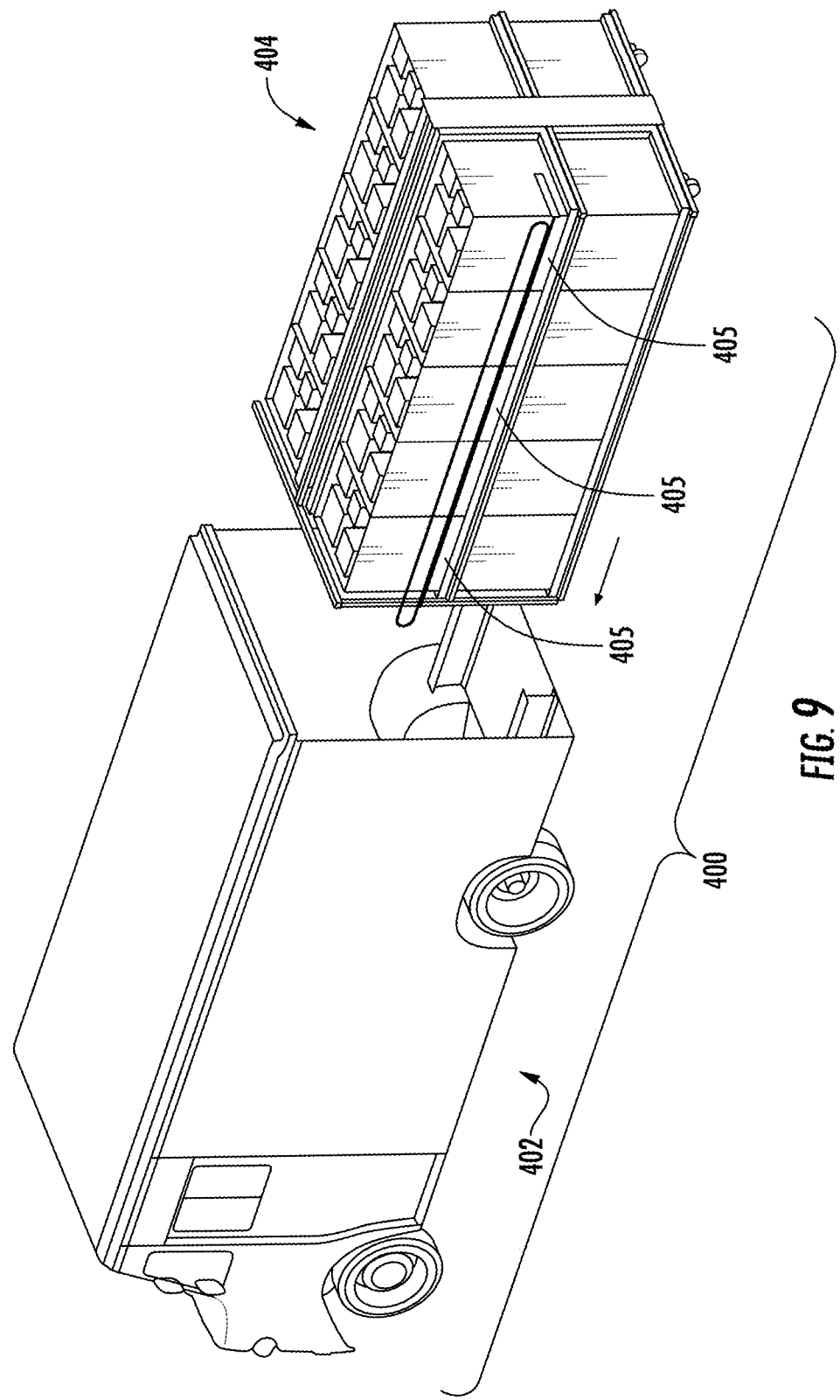
FIG. 9 is a perspective illustration of a delivery vehicle system including a delivery vehicle and a removable storage pod with the storage pod removed.
Figure 10:
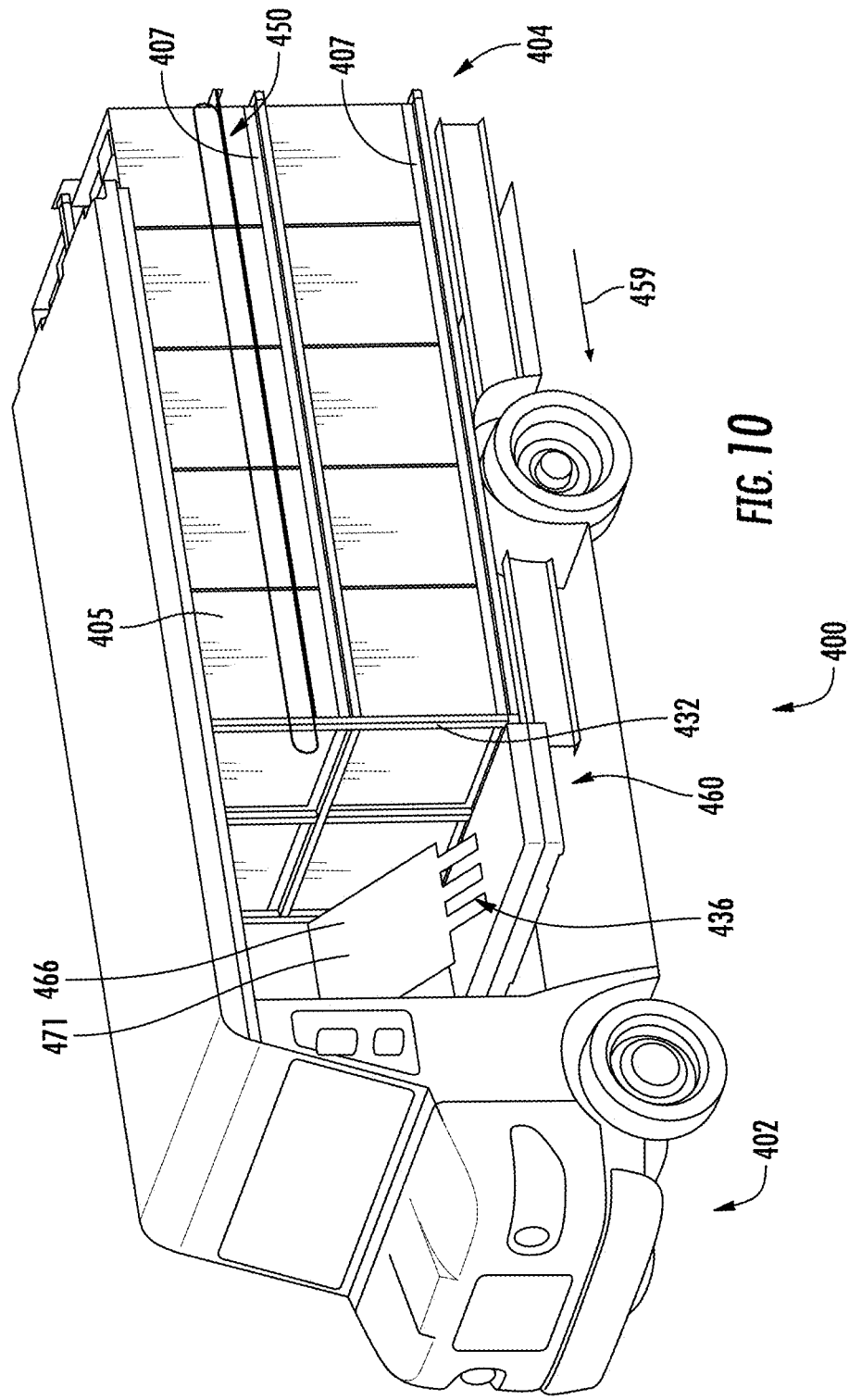
FIG. 10 illustrates the storage pod partially inserted into a storage enclosure of the delivery vehicle.

FIGS. 9 and 10 illustrate a further delivery vehicle system 400. The delivery vehicle system 400 is similar to delivery vehicle system 100 and includes a delivery vehicle 402 that carries a storage pod 404. The delivery vehicle 402 can be the same as the prior delivery vehicles discussed previously.

In this example, the packages 112 are carried in totes 405. an individual tote 405 may have one or more packages stored therein depending on the size and weight of the packages 112.

In one example, the storage pod is substantially identical to storage pod 104 but the packages are simply stored within totes 405. The totes 405 would be actuated by package actuation arrangement 150, actuation arrangements 160, 166, and dispensing actuation arrangement 170 from the storage zone 134 into package access zone 118. In this instance, the user would access the packages from the totes 405 until the totes 405 are emptied. Once emptied, a new tote would be transferred to the package access zone 118.

Figure 11:
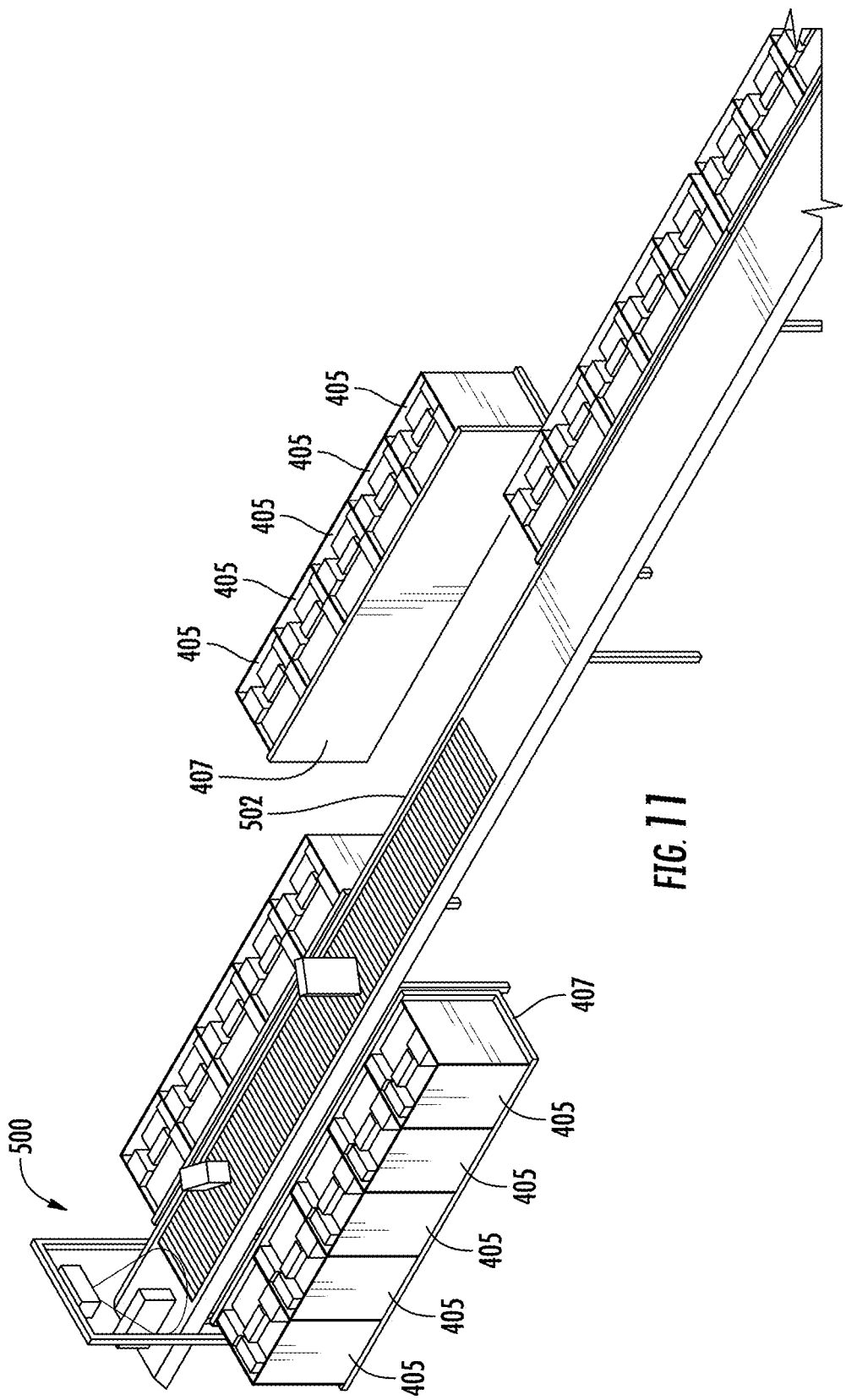
FIG. 11 illustrates a plurality of totes being loaded with packages.
Figure 12:
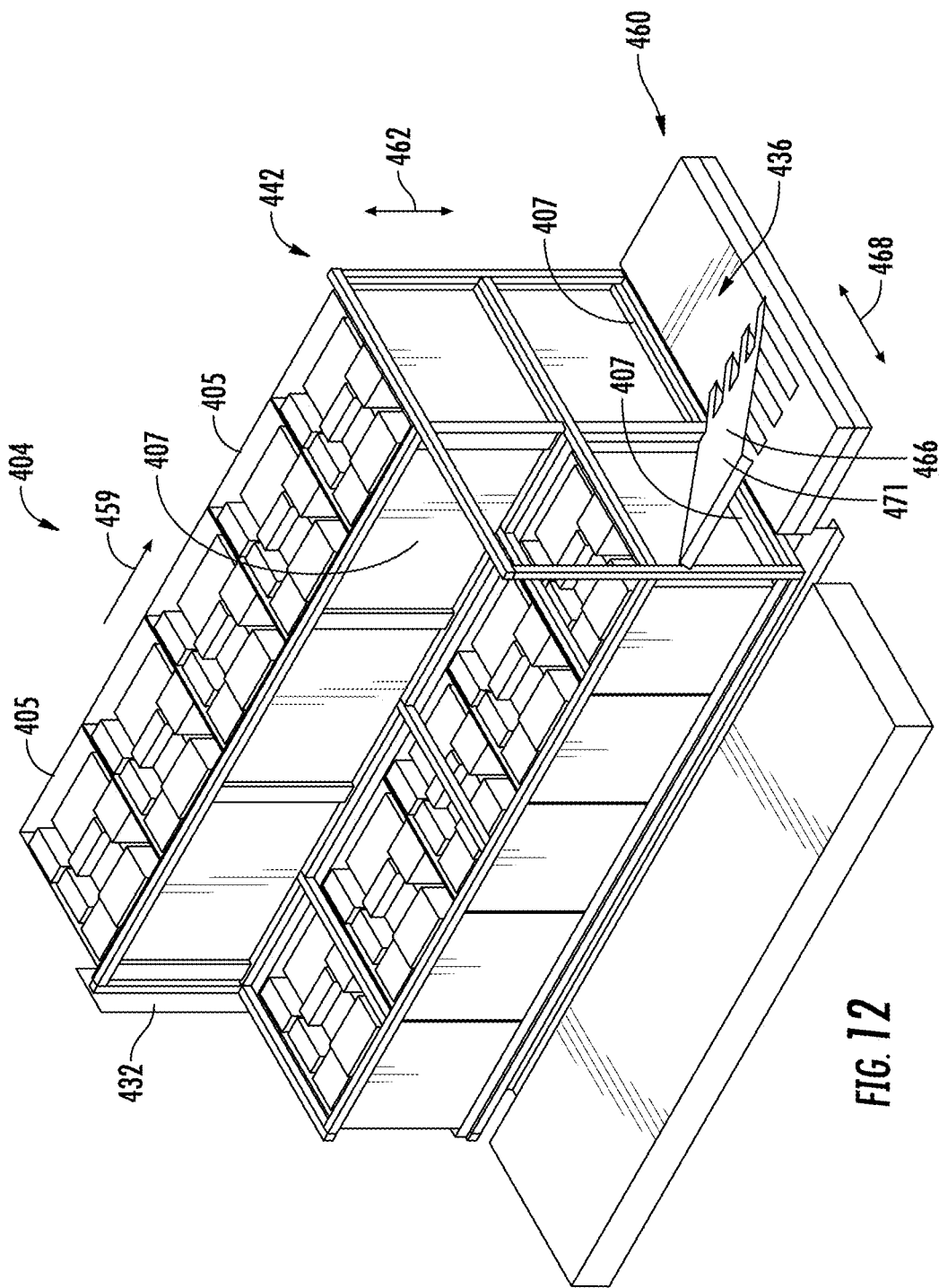
FIG. 12 illustrates a loaded storage pod prior to being installed in the delivery vehicle.

In a further example, and as illustrated in more detail in FIGS. 11 and 12, the totes 405 can be loaded into a carriage 407. Once the totes 405 of a carriage 407 are filled with packages 112, the carriage 407 is loaded into the frame 432 of the storage pod 404 (see. FIG. 12). In FIG. 12, the storage pod 404 includes four carriages 407 and 20 totes. However, different sized totes 405 and carriages 407 are contemplated. The carriage 407 a shelf of the frame 432 upon which the totes 405 sit.

With reference to FIGS. 9 and 10, the system 400 includes package actuation arrangement 450, which actuates the totes 405, and thus packages 112 therein, toward the front end 442 of the storage pod 404 illustrated by arrow 459. In this example, the package actuation arrangement 450 includes a belt system that operably engages the totes 450 to push the totes 405 in the direction as illustrated by arrow 459. The package actuation arrangement 450 could be the same as package actuation arrangement 150.

With reference to FIGS. 10 and 12, the system 400 also includes an actuation arrangement 460, e.g. an elevator, for vertically actuating totes 405, as illustrated by arrow 462. A second actuation arrangement 466 is used to laterally adjust the position of the totes 405. The combination of actuation arrangements 460, 466 locate the packages within a dispensing zone 436 of the storage pod 404 where the totes 405 are pushed from the storage zone 434 into the package access zone of the vehicle 402, like illustrated in FIG. 3 of the prior embodiment.

The dispensing actuation arrangement, such as dispensing actuation arrangement 170, is not illustrated in this example, but a similar arrangement could be incorporated for pushing the totes 405 out of the dispensing zone 436. Alternatively, a conveyor can be used to transfer the totes 405 from the dispensing zone 436 to the package access zone of the vehicle 402. Such a conveyor could be formed as part of the elevator 460.

In this example actuation arrangement 466 uses one or more ramps 471. While a single ramp 471 is illustrated. A second ramp 471 that is oriented opposite the illustrated ramp 471 is contemplated.

FIG. 11 also illustrates how the totes 405 are loaded. In this arrangement, packages 112 are passed through a scanner 500. The scanner 500 scans the package 112 for delivery information as well as for size/shape of the package. A conveying system 502 transports the package 112 to the desired tote 405. At that location, the package 112 is loaded into the desired tote 405. Typically, a robot, not shown, will pick the package 112 from the convey and then load it into the tote 405.

Once all of the totes 405 of a carriage 407 are filled with the necessary packages, the carriage 407 and associated totes 405 are loaded into the storage pod 404 frame 432. Once all carriages 407 have been loaded into the frame 432, the entire storage pod 404 is loaded on the vehicle 402.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A storage pod removably mountable to a delivery vehicle for holding packages to be delivered, the storage pod comprising:
    a frame defining:
        a storage zone where a plurality of packages are stored;
        a dispensing zone from which packages are dispensed from the frame;
    a conveying system mounted to the frame configured to transition packages from the storage zone to the dispensing zone;
    wherein:
        the storage zone includes:
            a first shelf mounted to the frame, the first shelf extending between a first end and a second end, a first axis being defined between the first end and the second end; and
            a second shelf mounted to the frame vertically above the first shelf, the second shelf extending between a first end and a second end of the second shelf, at least one of the first and second shelves being vertically offset from the dispensing zone;
        the conveying system includes:
            a first package actuation arrangement including a first pusher having a first pusher arm movable relative to the first shelf parallel to the first axis to push product supported by the first shelf toward the first end of the first shelf, the first pusher arm movable parallel to a first plane being orthogonal to the first axis such that the first pusher arm can be inserted between adjacent packages on the first shelf; and
            a second package actuation arrangement including a second pusher having a second pusher arm movable relative to the second shelf parallel to the first axis to push product supported by the second shelf toward the first end of the second shelf, the second pusher arm movable parallel to the first plane such that the second pusher arm can be inserted between adjacent packages on the second shelf.

2. The storage pod of claim 1, further comprising a third package actuation arrangement configured to move product along a second axis that is perpendicular to the first axis.

3. The storage pod of claim 2, wherein the conveying system includes a fourth package actuation arrangement configured to move product out of the dispensing zone.

4. The storage pod of claim 3, wherein any one of the third or fourth package actuation arrangements may include a pusher, a conveyor and/or a robotic arm.

5. The storage pod of claim 1, wherein:
    the conveying system further includes an elevator to transition a package vertically between an elevation of the at least one of the first and second shelves that is vertically offset from the dispensing zone and an elevation of the dispensing zone;
    the first and second pushers configured to push packages from the first and second shelves, respectively, onto the elevator.

6. A delivery vehicle system comprising:
    a chassis;
    a cab mounted to the chassis;
    a storage pod according to claim 1 removably mounted to the chassis, the storage pod including:
    a package access zone, wherein a user can access packages;
    a dispensing actuation arrangement configured to transition a package from the dispensing zone to the package access zone such that a user can access the package;
    wherein the package access zone is located within the cab.

7. The delivery vehicle assembly of claim 6, wherein:
    the delivery vehicle includes an enclosure; and
    the storage pod being loadable into the enclosure with packages located in the storage zone.

8. The delivery vehicle system of claim 7, wherein the storage pod is removeable from the enclosure in a substantially complete unit.

9. The delivery vehicle system of claim 6, further comprising a control system including a positioning module configured to determine a global position of the delivery vehicle, the control system further including a controller configured to control the conveying system to dispense a predetermined package from the storage pod when the determined global position is sufficiently proximate a delivery location for the package.

10. A storage pod removably mountable to a delivery vehicle for holding packages to be delivered, the storage pod comprising:
a frame defining:
a storage zone where a plurality of packages are stored, the storage zone including a first shelf mounted to the frame, the first shelf extending between a first end and a second end, a first axis being defined between the first end and the second end;
a dispensing zone from which packages are dispensed from the frame;
a conveying system mounted to the frame configured to transition packages from the storage zone to the dispensing zone, the conveying system including a first package actuation arrangement configured to move product supported by the first shelf toward the first end of the first shelf; and
wherein the conveying system further includes a third package actuation arrangement configured to move a package laterally perpendicular to the first axis;
a plurality of totes removably carried by the frame for holding the packages to be delivered;
wherein the conveying system is configured to transition the packages from the storage zone to the dispensing zone by selectively transitioning the totes from the storage zone to the dispensing zone with packages stored therein;
further comprising:
a first carriage and a second carriage, the first and second carriages being removably mounted to the frame within the storage zone;
a first plurality of totes of the plurality of totes removably carried by the first carriage;
a second plurality of totes of the plurality of totes removably carried by the second carriage;
wherein the conveying system is configured to transition the packages from the storage zone to the dispensing zone by transitioning the totes from the first and second carriages to the dispensing zone with packages stored therein.

11. The storage pod of claim 10, wherein:
the first shelf is vertically offset from the dispensing zone; and
the conveying system includes a second package actuation arrangement in the form of an elevator to transition the package vertically between an elevation of the first shelf and an elevation of the dispensing zone.

12. The storage pod of claim 10, wherein the third package actuation arrangement is one of a conveyor forming part of an elevator, a pusher or an actuator that moves the shelf upon which the package is sitting.

13. The storage pod of claim 10, further comprising a package dispensing actuation arrangement for pushing packages out of the dispensing zone.

14. The storage pod of claim 10, further comprising a control system including a positioning module configured to determine a global position, the control system further including a controller configured to control the conveying system to dispense a product from the frame when the determined global position is sufficiently proximate a delivery location.

15. The storage pod of claim 10, wherein:
the first package actuation arrangement is configured to move the totes toward a first end of the frame.

16. The storage pod of claim 15, wherein:
a first plurality of the totes are stored vertically offset from the dispensing zone; and
the conveying system includes a second package actuation arrangement in the form of an elevator to transition the totes of the first plurality of totes vertically between an elevation at which the first plurality of totes are stored and an elevation of the dispensing zone.

17. A storage pod to be removably mounted to a delivery vehicle, the storage pod holding packages to be delivered and configured to transport them from a stored position to a package access zone where a user can access the packages, the storage pod comprising:
a frame including:
a storage zone where a plurality of packages are stored, the storage zone including:
a first shelf mounted to the frame, the first shelf extending between a first end and a second end, a first axis being defined between the first end and the second end;
a second shelf mounted to the frame vertically above the first shelf, the second shelf extending between a first end and a second end of the second shelf;
a dispensing zone from which packages are dispensed from the frame, the dispensing zone being vertically offset from at least one of the first and second shelves;
a conveying system mounted to the frame configured to transition packages from the storage zone to the dispensing zone, the conveying system including:
a first conveying unit configured to move the packages toward a first end of the frame that includes the dispensing zone;
an elevator vertically movable between the dispensing zone and the at least one of the first and second shelves that is vertically offset from the dispensing zone to transition packages vertically; and
a dispensing arrangement adjacent the dispensing zone, the dispensing arrangement movable relative to the dispensing zone to push packages out of the dispensing zone,
wherein the first and second shelves are in the form of carriages removably mounted to the frame;
a plurality of totes carried by the carriages, the totes being configured to store the packages;
the dispensing arrangement is configured to push the totes from the dispensing zone with the packages within the totes to dispense the packages from the dispensing zone;
the conveying system is configured to transition the totes from the storage zone to the dispensing zone to transition the packages from the storage zone to the dispensing zone; and
the elevator is configured to transition the packages vertically by transitioning the totes vertically.

18. The storage pod of claim 17, further comprising a control arrangement that automatically controls the conveying system to transition a predetermined package from the storage zone to the dispensing zone and then out of the dispensing zone using the dispensing arrangement when the storage pod reaches a desired delivery location.

19. The storage pod of claim 17, wherein the first conveying unit includes a belt that operably attaches to the totes for moving the totes towards the first end of the frame.

20. A storage pod to be removably mounted to a delivery vehicle, the storage pod holding packages to be delivered and configured to transport them from a stored position to a package access zone where a user can access the packages, the storage pod comprising:
- a frame including:
  - a storage zone where a plurality of packages are stored, the storage zone including:
    - a first shelf mounted to the frame, the first shelf extending between a first end and a second end, a first axis being defined between the first end and the second end;
    - a second shelf mounted to the frame vertically above the first shelf, the second shelf extending between a first end and a second end of the second shelf;
    - a dispensing zone from which packages are dispensed from the frame, the dispensing zone being vertically offset from at least one of the first and second shelves;
- a conveying system mounted to the frame configured to transition packages from the storage zone to the dispensing zone, the conveying system including:
  - a first conveying unit configured to move the packages toward a first end of the frame that includes the dispensing zone;
  - an elevator vertically movable between the dispensing zone and the at least one of the first and second shelves that is vertically offset from the dispensing zone to transition packages vertically; and
- a dispensing arrangement adjacent the dispensing zone, the dispensing arrangement movable relative to the dispensing zone to push packages out of the dispensing zone wherein the conveying system includes:
- a first pusher having a pusher arm movable relative to the first shelf parallel to the first axis to push product supported by the first shelf toward the first end of the first shelf, the pusher arm movable parallel to a first plane being orthogonal to the first axis; and
- a second pusher having a second pusher arm movable relative to the second shelf parallel to the first axis to push product supported by the second shelf toward the first end of the second shelf, the second pusher arm movable parallel to the first plane.

* * * * *

UNITED STATES PATENT AND TRADEMARK OFFICE
CERTIFICATE OF CORRECTION

| | | |
|---|---|---|
| PATENT NO. | : 12,030,420 B2 | Page 1 of 1 |
| APPLICATION NO. | : 18/304895 | |
| DATED | : July 9, 2024 | |
| INVENTOR(S) | : Jacob Bausch et al. | |

It is certified that error appears in the above-identified patent and that said Letters Patent is hereby corrected as shown below:

In the Claims

Column 12, Claim 17, Line 44 currently reads:
"zone,"

Should correctly read:
--zone;--

Signed and Sealed this
Eighteenth Day of March, 2025

Coke Morgan Stewart
*Acting Director of the United States Patent and Trademark Office*